(12) United States Patent
Miller

(10) Patent No.: US 7,587,198 B2
(45) Date of Patent: *Sep. 8, 2009

(54) TELEPHONY APPARATUS

(75) Inventor: Larry Miller, Scottsdale, AZ (US)

(73) Assignee: Miller Asset, LLC, Scottsdale, AZ (US)

( * ) Notice: Subject to any disclaimer, the term of this patent is extended or adjusted under 35 U.S.C. 154(b) by 605 days.

This patent is subject to a terminal disclaimer.

(21) Appl. No.: 11/384,815

(22) Filed: Mar. 21, 2006

(65) Prior Publication Data

US 2006/0193458 A1    Aug. 31, 2006

Related U.S. Application Data

(63) Continuation of application No. 10/418,311, filed on Apr. 18, 2003, now Pat. No. 7,046,782.

(51) Int. Cl.
*H04M 3/42* (2006.01)
(52) U.S. Cl. .................................. 455/414.2; 455/565
(58) Field of Classification Search ............ 379/201.04, 379/207.13; 455/565, 411
See application file for complete search history.

(56) References Cited

U.S. PATENT DOCUMENTS

| | | | |
|---|---|---|---|
| 4,953,202 A | 8/1990 | Newell | 379/200 |
| 5,200,995 A | 4/1993 | Gaukel et al. | 379/200 |
| 5,280,521 A | 1/1994 | Itoh | 455/403 |
| 5,467,388 A | 11/1995 | Redd, Jr. et al. | 379/196 |
| 5,546,448 A | 8/1996 | Caswell et al. | 379/142 |
| 5,655,013 A | 8/1997 | Gainsboro | 379/188 |
| 5,692,033 A | 11/1997 | Farris | 379/67.1 |
| 5,802,157 A | 9/1998 | Clarke et al. | 379/196 |
| 5,809,126 A | 9/1998 | Smith et al. | 379/200 |
| 5,864,613 A | 1/1999 | Flood | 379/188 |
| 5,884,193 A | 3/1999 | Kaplan | 455/565 |
| 5,995,603 A | 11/1999 | Anderson | 379/142 |
| 6,246,756 B1 | 6/2001 | Borland et al. | 379/142 |
| 6,721,059 B1* | 4/2004 | Sturgeon et al. | 358/1.15 |
| 6,741,872 B1* | 5/2004 | Pinault | 455/564 |
| 6,768,792 B2 | 7/2004 | Brown et al. | 379/207.14 |
| 7,042,997 B2* | 5/2006 | Jones | 379/210.02 |
| 2002/0098874 A1 | 7/2002 | Zirul et al. | |

(Continued)

FOREIGN PATENT DOCUMENTS

WO    WO 99/13629 A1    3/1999

OTHER PUBLICATIONS

U.S. Appl. No. 60/435,819, for "Method and System for Wireless Communication," filed Dec. 20, 2002, Inventor: Donald Deubler (27 pages).

(Continued)

*Primary Examiner*—Creighton Smith
(74) *Attorney, Agent, or Firm*—Clay McGurk; The Law Office of Clay McGurk

(57) ABSTRACT

A system and methods through which incoming calls to and/or outgoing calls from a telephone can be controlled. The present invention utilizes an authorized caller list to determine whether an incoming call should be connected, and a similar list to determine whether an outgoing call should be connected. The present invention can also facilitate the use of new telephone user interfaces, including by iterating through telephone numbers associated with a contact, until communications with the contact are established.

5 Claims, 6 Drawing Sheets

U.S. PATENT DOCUMENTS

| | | | |
|---|---|---|---|
| 2002/0186827 A1* | 12/2002 | Griffiths | 379/207.02 |
| 2003/0008679 A1* | 1/2003 | Iwata et al. | 455/556 |
| 2003/0198325 A1 | 10/2003 | Bayne | 379/114.21 |
| 2004/0082310 A1* | 4/2004 | Huang et al. | 455/401 |
| 2004/0121759 A1 | 6/2004 | Creamer et al. | 455/410 |
| 2004/0137938 A1 | 7/2004 | Deubler, Jr. | |
| 2004/0137939 A1 | 7/2004 | Deubler, Jr. | |
| 2004/0204119 A1 | 10/2004 | Ho et al. | 455/564 |
| 2006/0119468 A1 | 6/2006 | Van Swaay | |

OTHER PUBLICATIONS

AT&T Speakerphone 730 Owner's Manual, 1991.

* cited by examiner

TELEPHONY APPARATUS

PRIORITY CLAIM

The instant application is a continuation of, and claims the benefit of, U.S. patent application Ser. No. 10/418,311, filed Apr. 18, 2003, now U.S. Pat. No. 7,046,782 which is incorporated herein by reference in its entirety.

FIELD OF THE INVENTION

The present invention relates to the field of telephonic communication, and more specifically, to a system and method through which calls incoming to and outgoing from a telephone can be restricted and controlled.

BACKGROUND OF THE INVENTION

Telephones have been in use for almost one hundred fifty years, but the technology involved has improved at a rate almost equal to that of computers. Today's highly automated systems, from voice controlled cellular telephones to high-speed electronic switching gear, have helped to make telephones almost ubiquitous.

As telephones have proliferated and the technology has abandoned, the cost of operating telephones has continued to decrease. For example, cellular telephone time, which used to cost on the order of a dollar a minute in some regions, is now at twenty to thirty cents per minute. Unfortunately for those paying the bills, these circumstances have lead to employees, roommates, children, and the like treating the telephone as if it were free of operating costs, which can ultimately result in high telephone bills.

Some in the prior art have sought to control outgoing telephone calls in an effort to reduce costs, especially those incurred by unauthorized individuals making calls outside a local calling area. By way of example, without intending to limit the present invention, U.S. Pat. No. 5,802,157, issued Sep. 1, 1998 to Clarke, et al., discloses a method and apparatus for controlling outgoing calls on a telephone line based on time of day and day of the week through a centralized call center. The centralized call center can also restrict incoming calls, requiring a caller to enter a privileged caller code before the call will be completed.

Another example of telephone call control systems employed in the prior art includes U.S. Pat. No. 5,809,129, issued Sep. 15, 1998 to Smith, et al., which discloses a stand-alone device which places or cancels outgoing calls based on a user-entered PIN code. The Smith invention teaches that emergency numbers and incoming calls are not barred. The device is designed to be installed within a telephone or across fixed telecommunications wiring installations within a building. The device can be configured with a default setting, such as no outgoing calls; emergency calls only; emergency and local calls; and emergency, local, and long distance calls (i.e. no international calls). Further, the device can be configured to block all numbers within a given exchange except for a specific number.

A third example of telephone call control systems employed in the prior art is U.S. Pat. No. 6,246,756, issued Jun. 12, 2001 to Borland et al. The telephone control system requires a user making an outgoing call to identify himself or herself to the system using a unique identifier. The unique identifier and the number to be called are then referenced against a pre-compiled list to determine whether the call will be established. If the call cannot be established, a recording may play which informs the user as to the reasons the call cannot be established. The system also captures the phone number associated with an incoming phone call and, if the number matches a predefined list, a system user may be required to enter a user identifier prior to the system user and the caller being able to communicate with each other.

Another concern raised by widespread telephone use, especially portable telephones, is safety. Many cellular telephone owners purchase telephones for their own safety or the safety of a loved one in case of an emergency. However, once people have a cellular telephone, they quickly begin using it for non-emergency calls as well, including receiving calls from a variety of people. Incoming calls can be very distracting, especially when the person being called is driving a car, sitting in a classroom, or is otherwise occupied. Some school systems, for example, forbid cellular telephones in schools, and others require that students turn the telephones off during the school day. While turning off a telephone reduces the likelihood of distraction, turning off the telephone prevents the telephone owner from receiving an incoming emergency call.

SUMMARY OF THE INVENTION

Accordingly, the present invention is directed to a system and methods through which incoming and outgoing telephone calls can be restricted or controlled in a manner that substantially obviates one or more of the problems due to limitations and disadvantages of the related art.

An object of the present invention is to limit connection of incoming calls to those callers who have been pre-authorized to call a particular telephone or telephone number.

Another object of the present invention is to limit the telephone numbers which can be called by a particular telephone.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

The present invention can impose limitations on incoming and/or outgoing phone calls through a variety of means, including, but not limited to, through Caller-ID technology. For incoming calls, the present invention allows a user or administrator to create one or more lists of authorized callers. Such lists may take the form of simple text-based files, databases, address books, or other electronic records. Incoming calls are monitored and compared to the authorized caller list and, if the incoming call is from an authorized caller, the call is connected. As used herein, reference to "connecting" an incoming call typically refers to the process of notifying the telephone user that a call is being placed to that telephone.

The authorized caller list of the present invention can include names and telephone numbers associated with authorized callers, as well as one or more authorized caller codes. The incoming call control method of the present invention can compare the telephone number from which an incoming call originates to the telephone numbers stored in the authorized caller list to determine whether the incoming call is from an authorized caller. The incoming call control method of the present invention can also compare the name associated with an incoming call, such as a name as appears in Caller-ID related text or in a reverse telephone number lookup directory, to names stored in the authorized caller list to determine whether the incoming call is from an authorized caller. Still further, the present invention may request that the caller enter an authorized caller code, and the entered code is compared one or more codes stored in the authorized caller list. When the present invention determines that an incoming call is from an authorized caller, the present invention can connect the call. Where the present invention is not able to determine that an incoming call is from an authorized caller, the present invention may play a message advising the caller that the telephone owner has blocked unauthorized incoming calls, and may transfer the call to a voicemail system associated with the telephone or disconnect the call.

By default, the present invention blocks all incoming calls except those from authorized callers. However, the present invention also allows a user to permit or further restrict incoming calls based on the time of day and day of the week at which the incoming call is received. This can be useful, for example, for technicians, students, doctors or other professionals who do not wish to be disturbed during the workday unless it is an emergency. By way of example, without intending to limit the present invention, a student's telephone may be configured to allow incoming calls from the student's parents any time, to allow calls from specific friends after school but before the student's bedtime, and to restrict unauthorized callers all the time. In another example, a corporation may issue a telephone to an employee and permit the employee to use the telephone without limitations on nights and weekends, but restrict the telephone to only incoming and outgoing calls to the main office telephone number during the business day. To assist parents or others who provide telephones to users in controlling the behavior of the telephone, the present invention can require the entry of one or more administrative codes prior to allowing creation or modification of an authorized caller list.

In one embodiment, the present invention may allow an administrator, such as a parent, to issue one or more one-time-use authorized caller codes to potential callers. The caller can enter the one-time-use authorized caller code as described above, and the present invention can treat the call as a call from an authorized caller. However, once the one-time-use authorized caller code has been used, the present invention may remove the one-time-use authorized caller code from the list of authorized caller codes. Time of day, day of the week, and call duration limitations may still be applied to calls authorized by a one-time-use authorized caller code.

The present invention can also limit outgoing calls. Outgoing calls are preferably limited by comparing an outgoing call telephone number to a list of authorized outgoing telephone numbers. If the outgoing call telephone number matches a number appearing on the authorized outgoing telephone number list, the present invention can allow the call to be placed. As with incoming calls, the present invention can allow an administrator or other user to limit the time during which calls to one or more telephone numbers can be placed. Where the present invention determines that an outgoing call cannot be placed, the present invention can notify the user by flashing one or more lights, or by playing a tone, set of tones, or recording. Further, to assist parents or others who provide telephones to users in controlling the behavior of the telephone, the present invention can require the entry of one or more administrative codes prior to allowing creation or modification of the authorized outgoing call list.

In addition to limiting the time of day and day of the week during which incoming and/or outgoing calls are restricted, the present invention can also limit the duration of calls to or from a given telephone number or contact and the frequency with which calls to that telephone number or contact can be reestablished. Such information can also be stored in the authorized caller list. This can be useful in limiting a child's ability to speak with friends via the telephone to no more than a given length of time per day.

In an alternative embodiment, the present invention may allow an administrator, such as a parent, to issue one or more one-time-use authorized number codes to a user, such as a child. The user can enter the one-time-use authorized number code prior to placing an outgoing call, and the one-time-use authorized number code can cause the present invention to treat the call as a call to an authorized number. A call authorized by a one-time-use authorized number code may be subject to time or duration limitations. Alternatively, a one-time-use authorized number code may be used to modify the default call time and/or duration limitations imposed on a call to an otherwise authorized number. By way of example, without intending to limit the present invention, a one-time-use authorized number code can be useful where a parent is traveling to a destination in which the parent's cellular telephone will not work, such as happens when a parent travels to Europe with a cellular telephone using Code Division Multiple Access (CDMA) technology.

The present invention can allow an administrator to store authorized caller and authorized number lists therein through a variety of means. By way of example, without intending to limit the present invention, an administrator may connect a telephone to a docking cradle or similar device, which in turn is attached to a computer, Portable Desktop Assistant (PDA), or the like. The administrator can then enter or modify the authorized caller and authorized number lists as appropriate. Alternatively, the present invention may allow an administrator to encrypt or digitally sign authorized caller and/or authorized number lists and transmit updates thereto to the present invention via E-mail, Short Message Service (SMS), or the like.

One advantage of the present invention is that, by limiting the number of telephone numbers to which outgoing calls can be placed, the present invention may require a less complicated user interface than those typically associated with telephones. By way of example, without intending to limit the present invention, a telephone according to the present invention may have only a limited number of buttons on the user interface, with specific buttons associated with specific outgoing telephone numbers or persons. Such buttons can allow an icon, photograph, or other image to be inserted therein, thus providing a graphical representation of the person, business, or other entity to be called. This can be especially advantageous for young children and for elderly persons who may not be able to remember a telephone number for a family member.

The present invention can also facilitate communicating with a desired contact. By way of example, without intending to limit the present invention, if a child needs to contact his or her parent, the present invention can be programmed with a ranked list of telephone numbers, and the present invention can iterate through such a list until the parent is contacted. Such a ranked list can include different telephone number priorities based on the time of day or day of the week.

It is presently preferred that the system and methods of the present invention be implemented within a telephone, such as, but not limited to, a Personal Communication Service (PCS), Global System for Mobile communication (GSM), Time Division Multiple Access (TDMA), CDMA, or other wireless telephone phone; a cordless telephone; a traditional telephone; or a telephone using Voice over Internet Protocol (VoIP) technology. In an alternative embodiment, the present invention may be implemented as a device which sits between a user's telephone and the public telephone system, the Internet, or other communications medium.

It is to be understood that both the foregoing general description and the following detailed description are exemplary and explanatory and are intended to provide further explanation of the invention as claimed and not to limit it.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENT

Reference will now be made in detail to the preferred embodiments of the present invention, examples of which are illustrated in the accompanying drawings.

Figure 1:
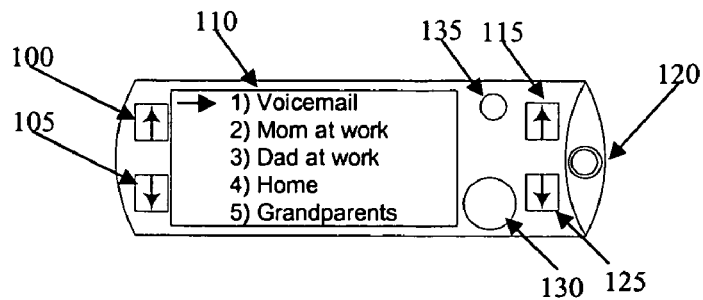
FIG. 1 is a front perspective view of a reduced-size telephone handset embodiment of the present invention.

The present invention can allow the creation of telephone user interfaces which require fewer buttons, and are therefore less complicated, than traditional telephones. For example a user using the reduced-size telephone handset illustrated in FIG. 1 may plug a headset, preferably containing a microphone and speaker, into headset jack 120. The handset can be turned on or off by pressing and holding button 130 for an extended time period, typically approximately five seconds. When the user wishes to place an outgoing call, the user can use buttons 100 and 105 to scroll through the list of contacts 110 to whom a call may be placed at the current time. The user can press button 130 to place a call to the contact. Buttons 115 and 125 can be used to adjust the volume while a call is in progress. Buttons 115 and 125 can also adjust the ringer volume, including selecting a vibrate mode, if depressed when a call is not in progress. In one embodiment, button 135 may act as a function key, altering the function of the other buttons. In another embodiment, all buttons other than buttons 100 and 105 may be inoperable unless button 135 is pressed, thereby preventing calls from being accidentally placed, and preventing the phone from switching from vibrate-only mode to an audible ringer mode. A BlueTooth communications means, Universal Serial Bus (USB) port, or other wired or wireless communications means (not illustrated) can be installed inside or at one end of such a handset to facilitate handset programming by a computer, PDA, or the like.

Figure 2:
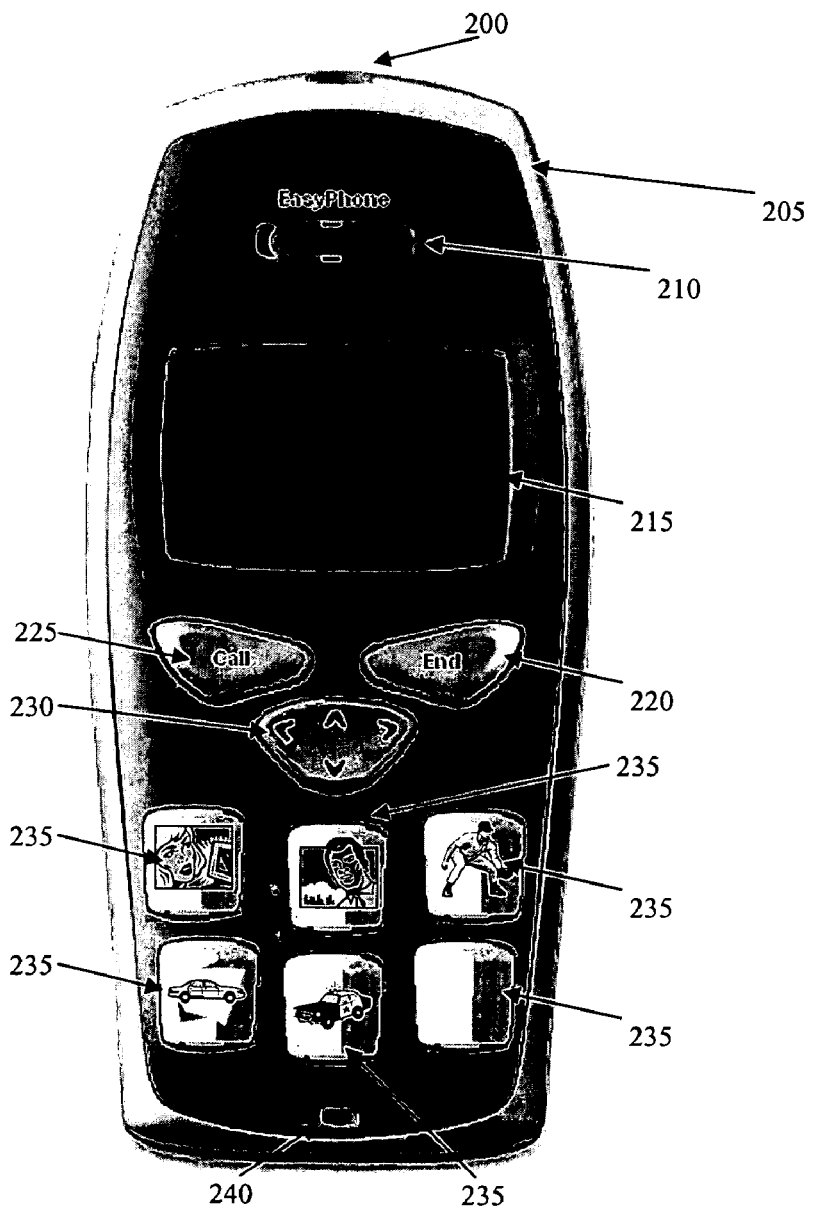
FIG. 2 is a front view of an alternative telephone handset embodiment according to the present invention.

FIG. 2 is a front view of an alternative telephone handset embodiment according to the present invention. In FIG. 2, the telephone may be turned on by pressing and holding button 225 for an extended period of time, such as five seconds. The telephone can be turned off by pressing and holding button 220 for a similar period of time. As illustrated by buttons 235, one embodiment of the present invention allows photographs, icons, or other pictorial representations to be inserted behind, displayed on, or otherwise associated with a given button. Pressing one of buttons 235 can allow a user to call the person; call a company, such as, but not limited to, a taxi company; call an emergency responder, such as, but not limited to, the police; or other entity illustrated thereon.

In a preferred embodiment, pressing and holding one of buttons 235 for an extended period of time, such as three seconds, can cause the present invention to utilize the outgoing caller locator method described below to reach the contact. Pressing a button for less than the extended period of time can cause a list of telephone numbers associated with the contact to be displayed in display 215. By pressing button 230, the user can select one of the contact's telephone numbers. A call to the selected number can be initiated by pressing button 225. When the user has finished the call, button 220 can be used to end the call. Speaker 210 and microphone 240, respectively, can allow a user to hear and speak with a contact. The color, flashing rate, or other appearance attributes of light 200 may alter depending on whether a call is being initiated or received, the status of the telephone battery, or the like. As with the handset of FIG. 1, the embodiment illustrated in FIG. 2 can include a USB or other interface which allows the telephone to be programmed using a computer, PDA, or the like.

Figure 3:
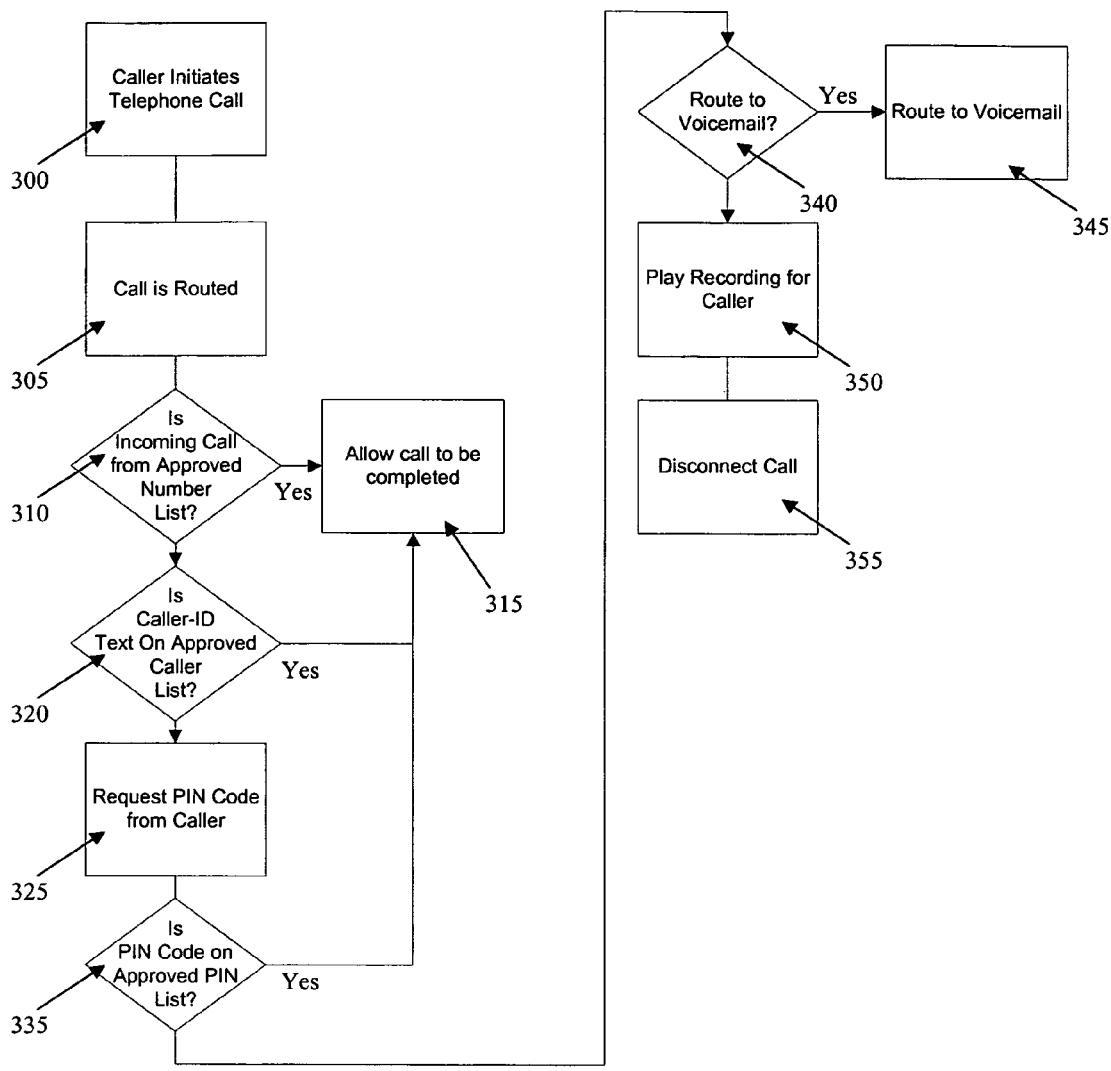
FIG. 3 is a flowchart illustrating a preferred incoming call evaluation method.

FIG. 3 is a flowchart illustrating a preferred incoming call evaluation method. As will be described below, the present invention preferably blocks all incoming calls except those from authorized callers. When an incoming call is initiated (Block 300), the call is routed to the present invention (Block 305) via standard, public telephone routers. When the incoming call arrives at the present invention, attributes of the call are compared to an authorized caller list to determine whether the call can be completed (Block 310).

In a preferred embodiment, the authorized caller list is a database of one or more names and telephone numbers from whom incoming calls are authorized. By way of example, without intending to limit the present invention, a parent may create an authorized caller list on a child's telephone that includes only the parent's cellular telephone, work telephone, and home telephone numbers. When an incoming call from telephone number appearing on the approved caller list is received (Block 310), the call can be completed (Block 315) and the telephone user can be notified of the incoming call, such as by ringing the telephone.

However, continuing with the previous example, a telephone-number based system alone may not always allow the parent to reach the child. For example, if the parent's company has multiple outgoing telephone lines, the parent's call may be routed through any of the lines. Rather than forcing the parent to program all possible outgoing call lines as authorized numbers, the present invention can allow the parent to simply store the Caller-ID text associated with the company as a name in the authorized caller list. The present invention can then compare the Caller-ID text associated with an incoming call to names appearing in the authorized caller list and accept or deny an incoming call based on such a comparison.

One embodiment of the present invention completes or disconnects calls based simply on the phone number and Caller-ID text associated with the incoming call. An alternative embodiment, which is illustrated in FIG. 3, also allows the entry of one or more Personal Identification Number (PIN) codes, Public Key Infrastructure (PKI) keys, biometric identifiers, or other authorization information into the approved caller list. If an incoming call does not match a telephone number or name in the approved caller list, the present invention can request authorization information from the caller (Block 325). Where the authorization information provided matches an entry in the approved caller list (Block 335), the present invention can allow the call to be completed (Block 315).

In the embodiment illustrated in FIG. 3, if the phone number and/or Caller-ID text of an incoming call does not appear on an approved caller list, and if the caller is not able to provide authorization information allowing the call to be completed, the present invention can allow the call to be routed to voicemail (Blocks 340 and 345). In a preferred embodiment, if the caller is not routed to voicemail, the present invention may play a recording for the caller indicating that the call cannot be connected at the present time (Block 350), and the call is disconnected (Block 355).

It is important to note that in a preferred embodiment of the present invention, where the logic flows past Block 335, the user to whom an incoming call is placed may never be aware that the incoming call existed. This can significantly reduce the likelihood of unwanted, unnecessary, or unauthorized calls distracting the user.

Figure 7:
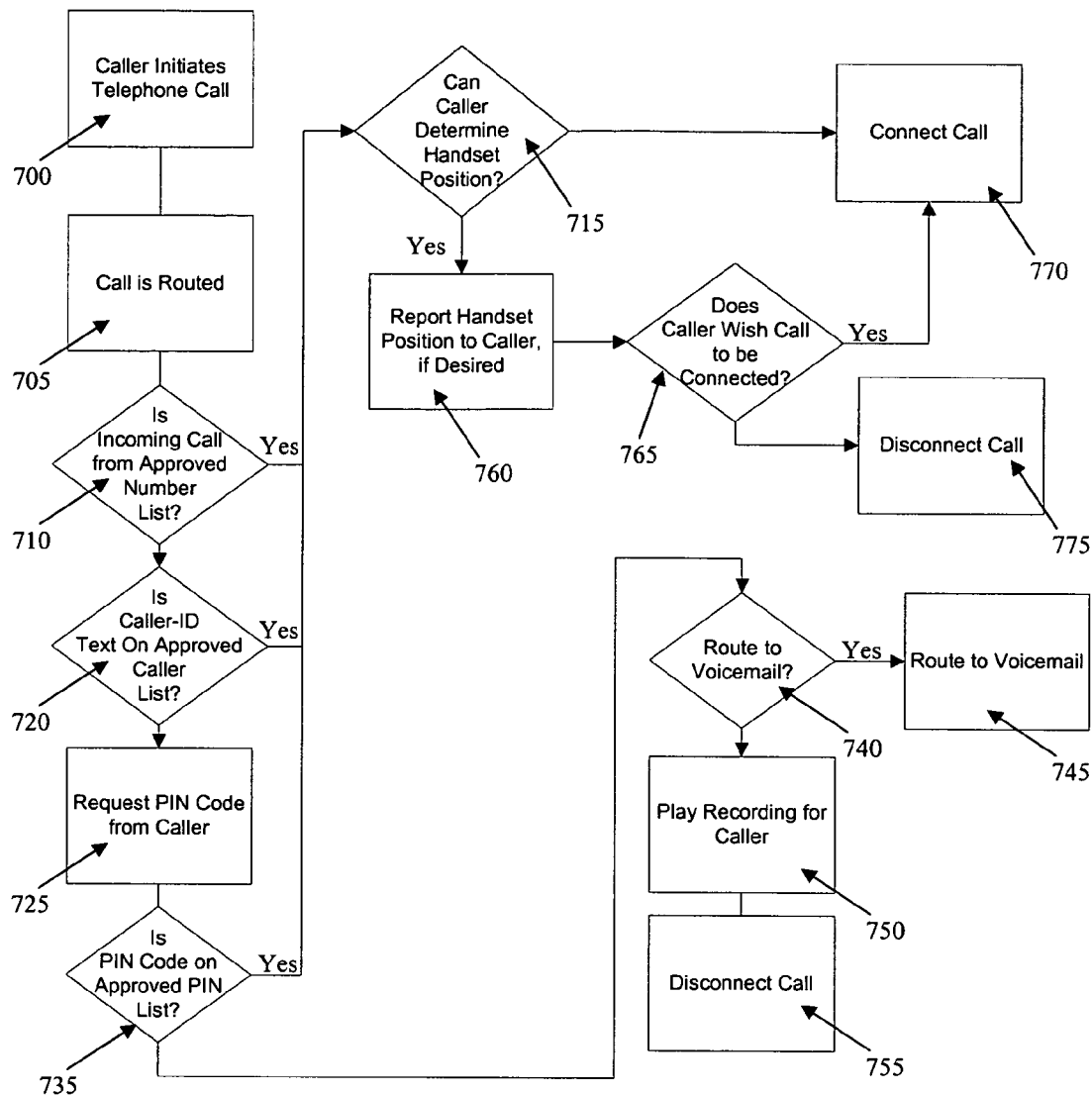
FIG. 7 is a flowchart illustrating a preferred incoming call evaluation method with position location reporting capabilities.

One aspect of the present invention involves equipping a telephone handset with a Global Positioning System (GPS) receiver, LORAN-C receiver, or other position determination device. The position determination device can preferably determine the location of a telephone handset to within a radius of a few meters. FIG. 7 is a flowchart illustrating a preferred incoming call evaluation method with position reporting capability. By equipping a telephone handset with such a device, the present invention can allow authorized callers to determine the position of the telephone handset. In a preferred embodiment, the present invention can monitor authorized callers and, for those authorized to obtain position information, the present invention can report the location of the telephone handset. In one embodiment, the present invention may allow position information to be reported to an authorized caller without completing the call or otherwise alerting the person holding the telephone handset.

In the embodiment illustrated in FIG. 7, an incoming call is handled in a manner similar to that described above with respect to FIG. 3. However, when an incoming call is received from an approved caller (Blocks 710, 720, and 735), the present invention can determine whether the caller is authorized to receive the handset's position information (Block 715). If the caller is not authorized to receive the handset's position information, the present invention connects the call (Block 770). If the caller is authorized to receive the handset's position, the present invention can query the caller as to whether he or she wishes to receive such information, and can report the position to the caller (Block 760). Such reporting may take a variety of forms, including, but not limited to simply reporting the appropriate coordinates; translating the information into a graphical form, such as on a map; or providing contextual information, such as from a database of information known about a given set of coordinates. This last reporting method can, by way of example, tell the caller that the telephone handset is at Springfield Mall, in Tom's bedroom, in the Gymnasium at school, or other such information.

Once the handset position has been reported to an authorized caller, the present invention asks the caller if the call should be connected (Block 765). The call is then either connected (Block 770) or disconnected (Block 775).

By way of example, without intending to limit the present invention, the position location aspect of the present invention may be useful a parent of a child who is frequently truant from school. Using the system and methods of the present invention, the parent can determine the child's location at any time, without alerting the child to such monitoring. The parent's ability to so monitor the child's location may be a sufficient motivation to encourage the child to stay in school. By using the present invention, a parent would be able to take advantage of this motivation without the concern that an unauthorized caller would be able to determine the child's position.

By way of further example, without intending to limit the present invention, the present invention may be useful for users who chronically lose their telephones or whose telephones have been stolen. By obtaining the position of the telephone, such users can quickly locate and either recover a lost phone or report the location of the lost phone to the police.

Figure 4:
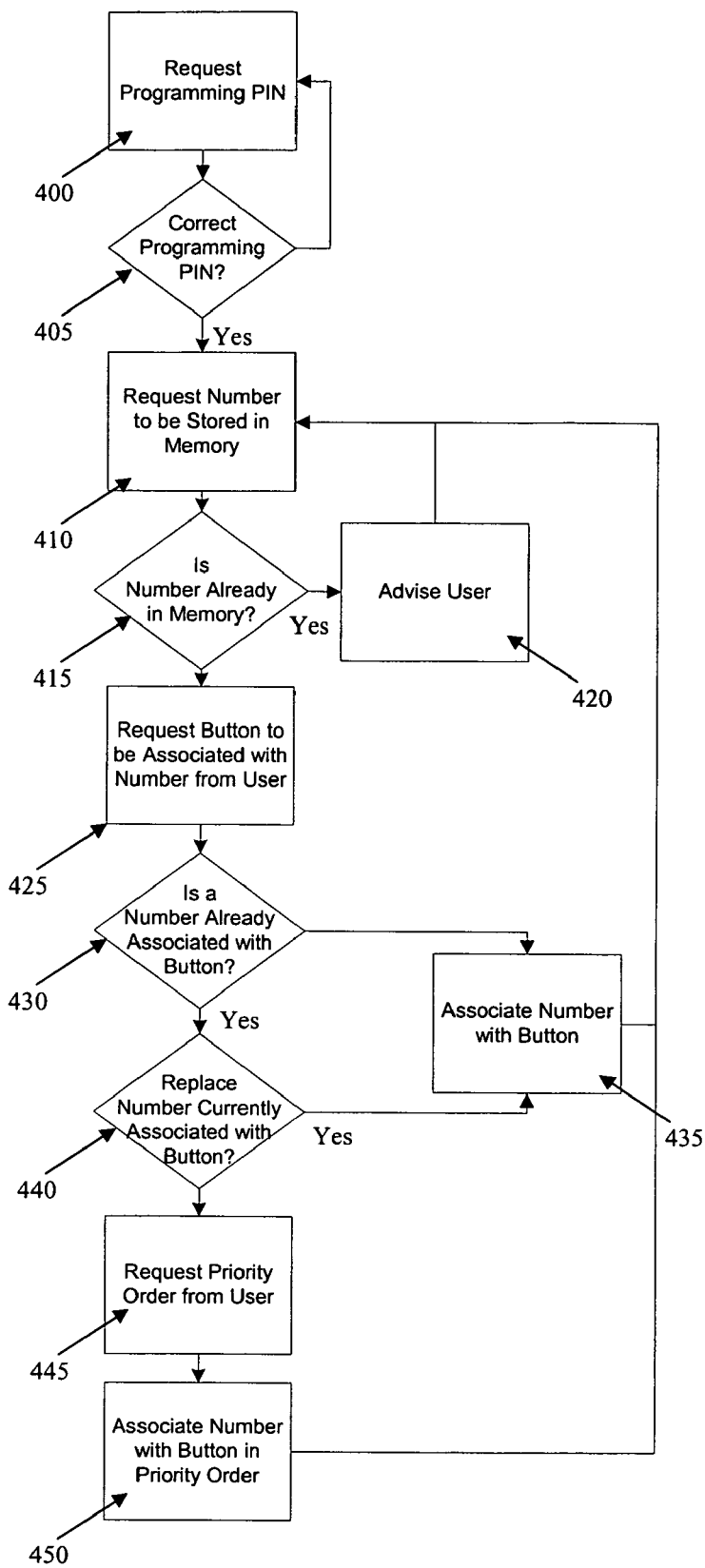
FIG. 4 is a flowchart illustrating a preferred programming method.

FIG. 4 is a flowchart illustrating a preferred programming method. For the purposes of describing FIG. 4, it is assumed that the present invention is implemented within a telephone handset. However, it should be appreciated by one skilled in the art that the present invention can be implemented as a device which sits between a user's telephone handset and the public telephone system.

Programming of the present invention preferably begins when the present invention is able to communicate with a computer, PDA, or other device, such as through a USB port or serial port, through the establishment of communications via BlueTooth, WiFi, IEEE 803.11(g), infrared, or other wireless or wired communications means. Alternatively, the present invention may provide an interface permitting direct programming of the present invention. In still another embodiment, the present invention may be programmed using incoming SMS messages or E-mail messages. In yet another embodiment, the present invention may support Telnet, Hypertext Transfer Protocol (HTTP), File Transfer Protocol (FTP), or other such protocol to facilitate programming via a network-like connection to the device.

In the preferred embodiment illustrated in FIG. 4, the present invention preferably requests a PIN code, PKI key, biometric identifier, or other authorization information (Block 400) when programming begins. If the authorization information is not valid, the present invention may not allow new authorization information to be tried for a fixed or random period of time. If the authorization information is valid (Block 405), the present invention may request the name or telephone number to be stored in the authorized caller list (Block 410). If the name or number entered is already stored in the authorized caller list (Block 415), the present invention may notify the user (Block 420) and request a new name or number. If the name or number is not already stored in the authorized caller list, the name or number is stored, and the user is given the option of associating the name or number with one or more user interface elements, such as buttons (Block 425).

If the user interface element does not have a name or number already associated with it (Block 430), the name or number is associated with the user interface element (Block 435), and the user can enter more names or numbers (Block 410). If the user interface element has a name or number associated with it, the user is asked whether the name or number entered should replace the stored name or number (Block 440). If the user chooses to replace the name or number associated with the user interface element, the entered name or number is associated with the user interface element (Block 435), and the user can continue entering names and numbers (Block 410).

If the user chooses not to replace the name or number associated with the user interface element, the present invention can inquire where in the user interface element's priority list the new name or number should be stored (Block 445). The present invention then associates the new name or number with the user interface element in the appropriate priority order (Block 450), and the user can continue entering names and numbers (Block 410).

The preferred programming method described above allows not only multiple telephone numbers, but also multiple contacts, to be associated with a given user interface element. By way of example, without intending to limit the present invention, the son of an elderly parent may program his contact information into the parent's telephone, along with contact information for his siblings. He can then associate all of the siblings with a single user interface element, and assign them a priority order based on the distance they live from the elderly parent. Thus, in the event of a non-life-threatening emergency, the elderly parent need only activate the single user interface element, and the present invention can iterate through all the contact information for each sibling, in priority order, until a sibling is reached. Although the programming method described above is presently preferred, it should be apparent to those skilled in the art that alternative programming methods can be employed without departing from the spirit or the scope of the invention.

An alternative programming embodiment of allows the telephone handset to periodically report its position to one or more authorized callers based on a position determining device embedded therein. An administrator, parent, or the like can specify the frequency and times at which such information should be reported, as well as the telephone number(s), Internet Protocol (IP) address(es), domain name(s), E-mail address(es), or the like to which the position information should be reported.

Figure 5:
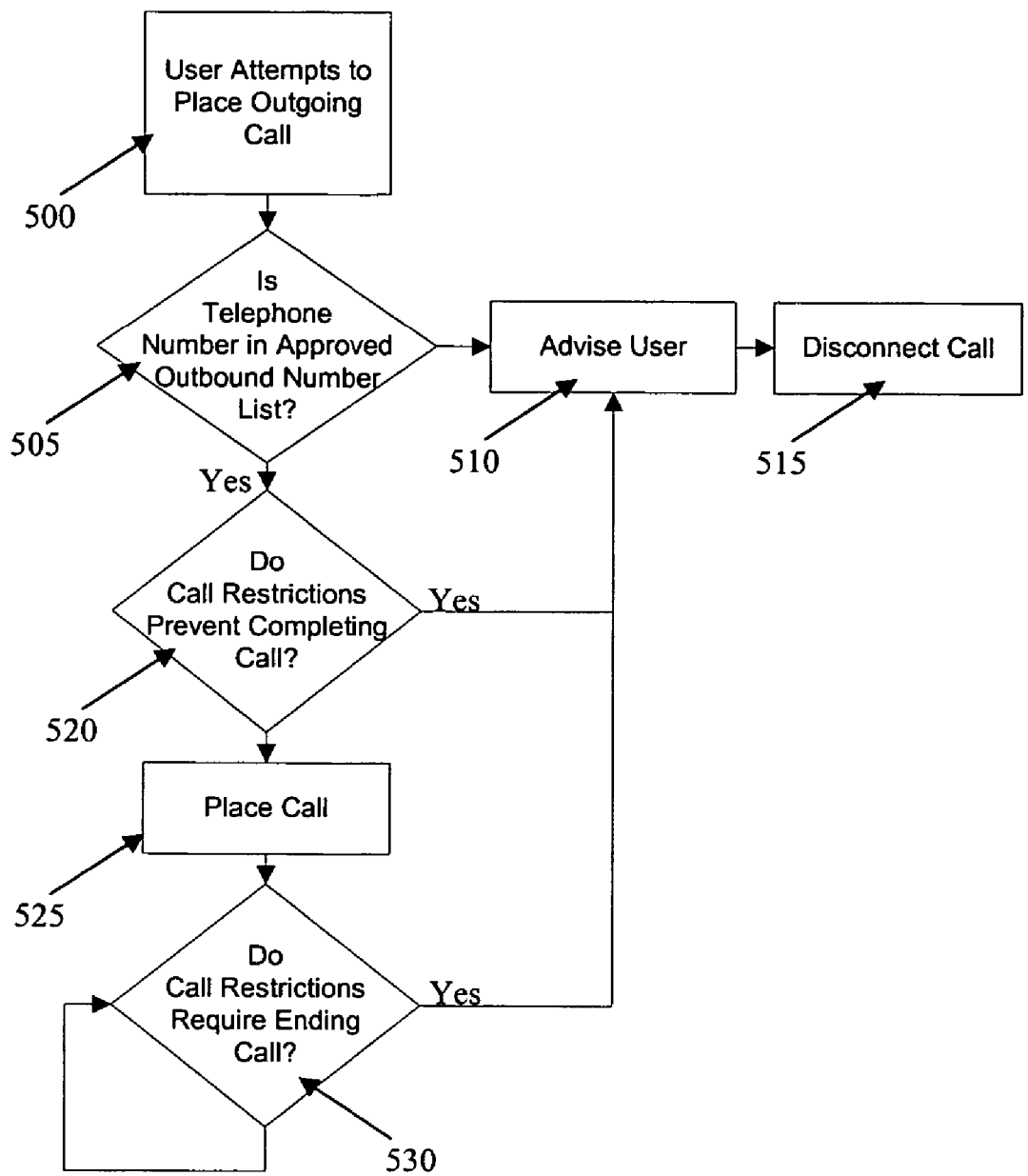
FIG. 5 is a flowchart illustrating a preferred outgoing call evaluation method.

FIG. 5 is a flowchart illustrating a preferred outgoing call evaluation method. Such a method is more useful in traditional telephones than in those illustrated in FIGS. 1 and 2, although the method can be applied in such telephones as well. In Block 500, the telephone user attempts to place an outgoing call. As will be described below, the present invention preferably blocks all outgoing calls except those to authorized telephone numbers. The present invention preferably contains a list of telephone numbers to which outgoing calls are authorized. Such a list may also include the time of day and/or day of the week on which calls to specific telephone numbers, or calls to all telephone numbers, are approved. The list can further include the duration a call to a specific telephone number, or all telephone numbers, should last, and such durations can vary based on the time of day and day of the week. The list can also include a restriction on the frequency with which outgoing calls can be placed, either in general or with respect to specific outgoing telephone numbers. By way of example, without intending to limit the present invention, the outgoing call evaluation method of FIG. 5 can allow a parent to regulate when a child can call a friend, the duration of the call, and the frequency with which the child and the friend can speak, thereby preventing the child from simply redialing his or her friend to continue the conversation.

In a preferred embodiment, the telephone number associated with the outgoing call is compared against the approved outgoing number list (Block 505) and rules associated therewith (Block 520). If the outgoing call is not approved at the current time, the user is so advised (Block 510), and the call is disconnected (Block 515). If the outgoing call is approved, the call is placed (Block 525). The duration of the call is monitored (Block 530), and if the call rules require ending the call, a notification is provided to the user (Block 510) prior to disconnecting the call (Block 515).

Figure 6:
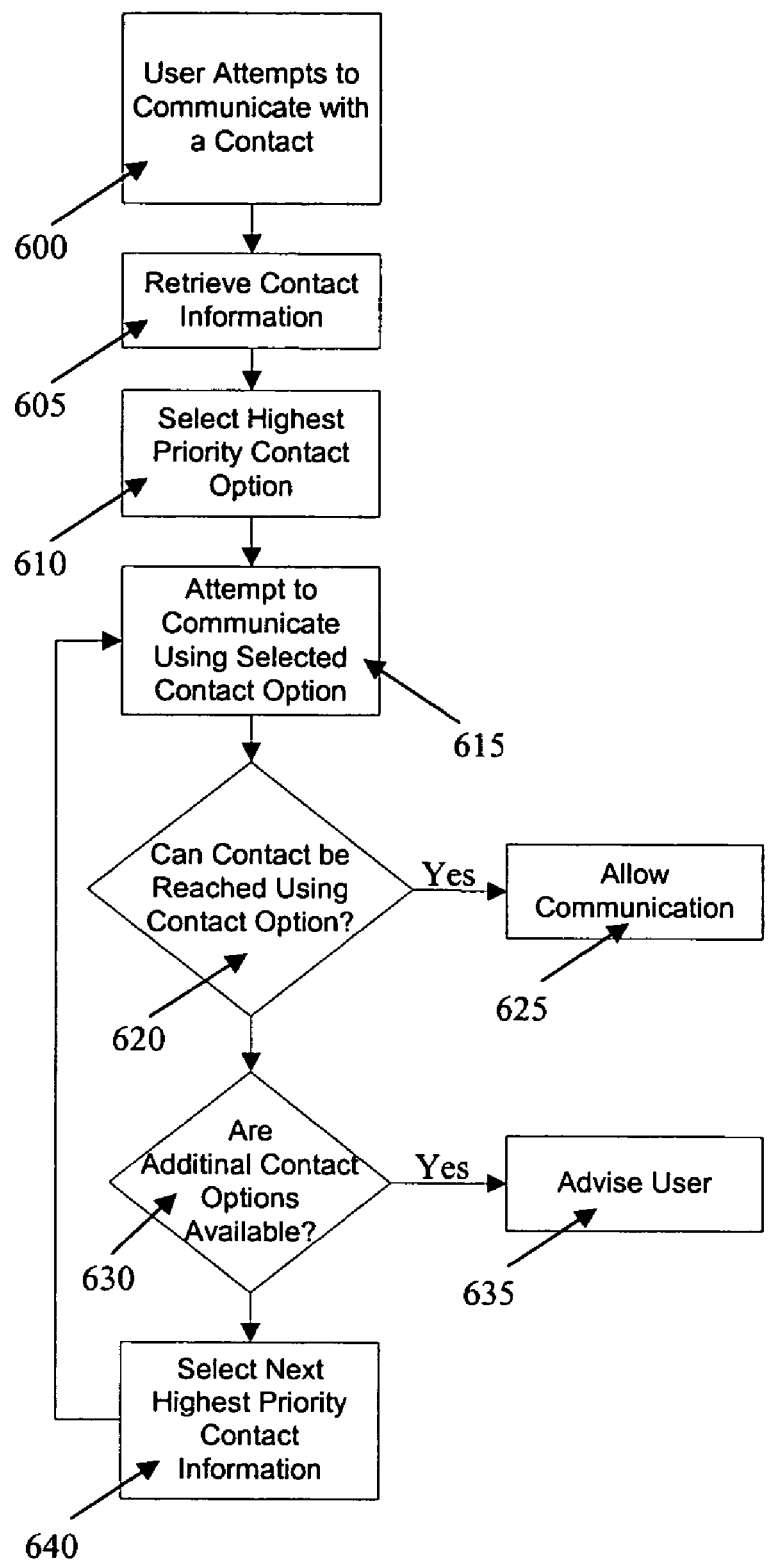
FIG. 6 is a flowchart illustrating a preferred contact locator method.

FIG. 6 is a flowchart illustrating a preferred contact locator method. In this method, when a user attempts to communicate with a contact (Block 600), the present invention retrieves contact information for the contact (Block 605), selects the highest priority contact option (Block 610), and attempts to communicate using the selected contact option (Block 615). In one embodiment of the present invention, contact option priority may be assigned based on the time of day or day of the week. If the contact can be reached using the selected contact option (Block 620), then communication is allowed by the present invention (Block 625). If the contact cannot be reached using the selected contact option (Block 630), the present invention selects the next highest contact option (Block 640) and attempts to establish communications via that contact option (Block 615). If contact cannot be established an no additional contact options are available, the present invention may begin with the highest priority contact option again, or the user may be advised that the contact cannot be reached (Block 635).

The outgoing call locator method of the present invention can allow a user to communicate with a contact using a variety of means. By way of example, without intending to limit the present invention, a user may specify that an attempt should first be made to call the contact at the contact's cellular telephone number, then at the contact's business telephone number, then at the contact's home telephone number, and finally using SMS text messages to the contact's telephone or pager.

By way of example, without intending to limit the present invention, the outgoing call locator method of the present invention can be very useful in emergency situations, especially where the telephone handset is equipped with a position determination device. For example, a parent may program the asterisk (*) key on the telephone to dial 911 or another emergency number first and, if communications cannot be established with 911, then to contact the parent at any of a variety of numbers. If a child presses and holds the asterisk key for an extended period of time, the present invention can contact 911 or the parent and report the child's position without the child ever having to speak or otherwise interact with the 911 operator or the parent. This can be especially useful in kidnapping or other scenarios where an assailant may not know that the child has a telephone, and but where the child's use of the telephone would alert the assailant to that fact.

Although the description above focused on telephones and telephone calls, it should be apparent to one skilled in the art that the system and methods of the present invention can be used for a variety of devices and communications means. By way of example, without intending to limit the present invention, many people have portable devices, such as PDA's and pagers, which are capable of text-based messaging, including SMS, E-mail, and the like. The present invention can control communications into and out of such devices by substituting a list of approved E-mail addresses or SMS ID's for the approved caller list and approved number list described above.

Through the system and methods described above, the present invention can facilitate controlling incoming calls to and/or outgoing calls from a telephone. The present invention utilizes an authorized caller list to determine whether an incoming call should be connected, and a similar list to determine whether an outgoing call should be connected. The present invention can also facilitate the use of new telephone user interfaces, including by iterating through telephone numbers associated with a contact, until communications with the contact are established. While the invention has been described in detail and with reference to specific embodiments thereof, it will be apparent to those skilled in the art that various changes and modifications can be made therein without departing from the spirit and scope thereof. Thus, it is intended that the present invention cover the modifications and variations of this invention provided they come within the scope of the appended claims and their equivalents.

What is claimed is:

1. A method of reporting a position of a telephone handset, the method comprising:
   receiving authorization information;
   when the authorization information is valid, entering a list of authorized contacts;
   receiving and storing the list of authorized contacts;
   determining the position of the telephone handset; and
   reporting the position of the telephone handset to at least one of the authorized contacts.

2. The method of claim 1, further comprising:
   determining the position of a handset of the at least one of the authorized contact; and
   reporting the position of the handset of the at least one of the authorized contact to the telephone handset.

3. The method of claim 1, wherein the position of the telephone handset is reported as a set of coordinates.

4. The method of claim 1, wherein the position of the telephone handset is reported periodically.

5. The method of claim 4, wherein the periodically reported positions of the telephone handset are displayed on a map.

* * * * *